Nov. 7, 1950     H. N. BOYER     2,528,815
SHEARS
Filed Nov. 26, 1947
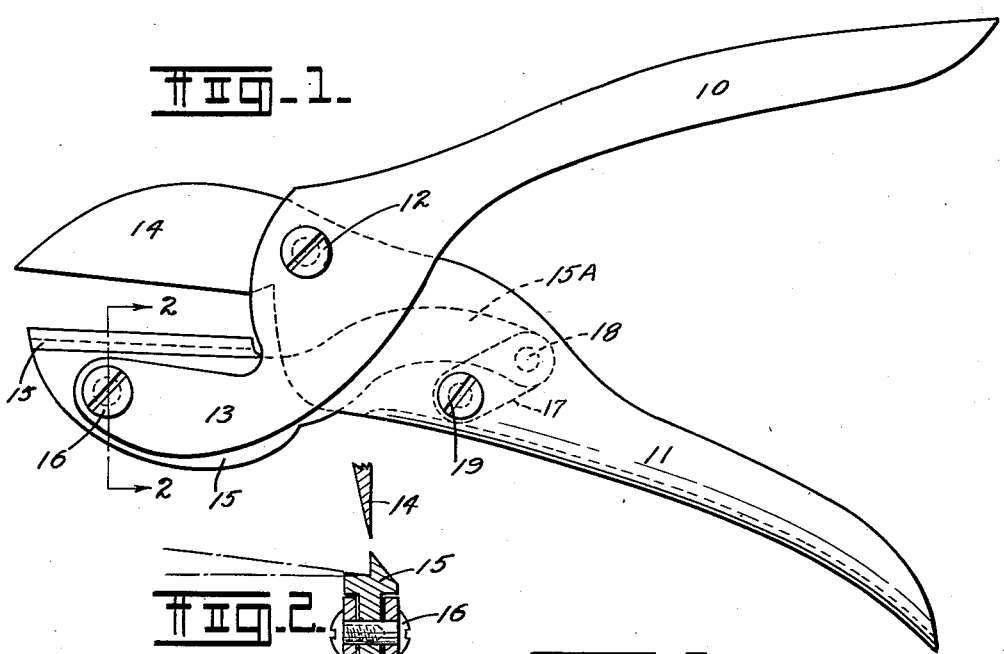
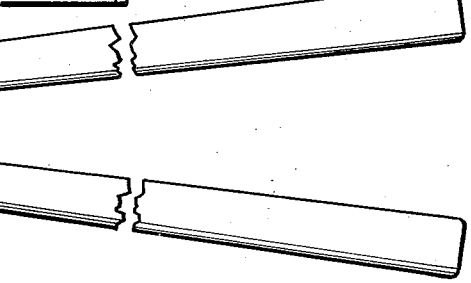
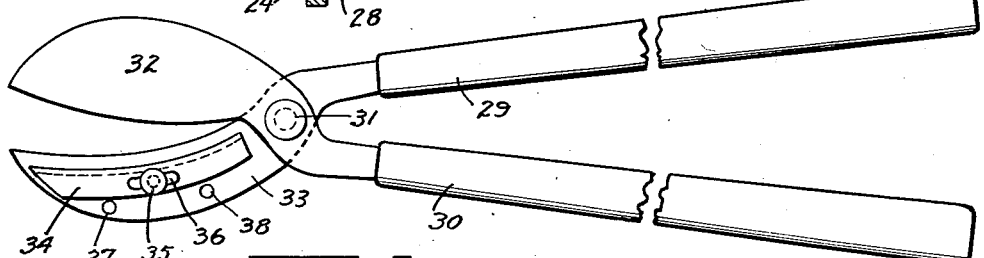
INVENTOR.
Hugh N. Boyer.
BY
ATTORNEY.

Patented Nov. 7, 1950

2,528,815

UNITED STATES PATENT OFFICE 2,528,815

SHEARS

Hugh N. Boyer, near Canfield, Ohio; Elizabeth M. Boyer executrix of said Hugh N. Boyer, deceased Application November 26, 1947, Serial No. 788,192

5 Claims. (Cl. 30—173)

This invention relates to a shear and more particularly to a pruning shear incorporating a combination blade and anvil.

The principal object of the invention is the provision of a blade and anvil jaw construction particularly adaptable to pruning and lopping shears and the like.

A further object of the invention is the provision of a shear incorporating a pivoted anvil forming one of the jaw members of the shear.

A still further object of the invention is the provision of a shear incorporating a movable anvil forming one of the jaw members and including means for moving the pivoted anvil to cause it to maintain approximately parallel relationship with a blade of the said shear.

A still further object of the invention is the provision of a shear incorporating a blade structure wherein a cutting blade and opposing anvil are provided for insuring an efficient cutting action therebetween.

The shear shown and described herein comprise in part an improvement over that shown in my co-pending patent application Serial No. 624,192, filed October 24, 1945, now abandoned, and in part a continuation thereof. The novelty in the present disclosure lies in the provision of a combination anvil and blade forming one of the jaw members of the shear, the anvil being movably positioned with respect to the blade. As originally disclosed in my aforementioned copending patent application, a combination anvil and blade was disclosed, the blade being formed directly on the anvil.

The shear shown and described herein form a more efficient and satisfactory tool for the pruning of trees, shrubs and the like. It is well known in the art that many types of shears have been devised which generally incorporate a scissors-like action usually obtained by pivoting a pair of combination handle and jaw members to one another and forming the jaw members in opposed blades engaging one another in a scissors-like shearing action. It is also known that these previously known forms of pruning shears and the like are generally difficult to operate on relatively large branches of trees or shrubs. Generally, the open position of the blades resembles a V shape, very narrow at the point between the blades closest the pivot point of the shear blades necessitating engaging a branch or limb to be cut at some distance from the pivot point of the shear. In addition to this difficulty, the common tendency of a scissors type shear is to spread the blades transversely with respect to their normal opposed vertical action. Such spreading of the blades generally occurs when the shear is moved during the cutting action and results in an incomplete cut and a subsequent tearing of the branch or limb being severed.

The present invention relates to an improved pruning shear wherein means is provided for altering the normal fixed positioning of the blades so as to maintain the blades in approximately parallel position throughout their opening and closing range and thereby enable a large limb to be positioned between the blades very close to the pivot point of the shears. It will be obvious that a limb or branch positioned very close to the pivot point of the shear is much easier to cut by reason of the increased leverage thereby obtained. Additionally, one of the blades of the shear disclosed herein is provided with an anvil so that in addition to a shearing action obtained between the opposed shear-like blades, a blade against an anvil action is also obtained thereby providing two definite and separate types of severing actions; one, the shearing between the slidably engaging blades, and two, the engagement of one of the blades against the anvil formed on the other blade.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of a shear.

Figure 2 is a cross section taken on line 2—2 of Figure 1.

Figure 3 is a side elevation of a lopping shear illustrating a modified form of anvil applied to one of the blades thereof.

Figure 4 is a cross section taken on line 4—4 of Figure 3.

Figure 5 is a side elevation of a modified form of lopping shear showing a further modification of an anvil applied to one of the blades thereof.

By referring to the drawings and Figures 1 and 2 in particular it will be seen that a pruning shear has been disclosed as comprising a pair of handle members 10 and 11 crossed and pivoted to one another by means of a pivot 12, the handle 10 having a forwardly extending bifurcated jaw section 13 and the handle 11 having a blade 14 affixed thereto and positioned above the bifurcated jaw 13 on the handle 10. An anvil blade 15 is pivotally affixed to the bifurcated jaw 13 adjacent the forward end thereof by a transverse pivot 16 engaging the bifurcated jaw 13.

By referring to Figure 1 of the drawings it will be seen that the anvil blade 15 has an extension 15A extending backwardly between the bifurcated portions of the handle 11 and pivoted thereto by means of a pair of links 17 and a pair of pivots 18 and 19. The pivot 18 engages the upper ends of the links 17 and an opening in the end portion of the extension 15A of the anvil blade 15. The pivot 19 engages the links 17 and the bifurcated handle 11. It will thus be seen that when the pruning shear is in open position, as illustrated in Figure 1 of the drawings, the extension 15A of the anvil blade 15 will be moved downwardly with respect to the handle 11 by the movement of the links 17 and their pivotal connection through the pivot 19 with the handles 11. This results in maintaining the anvil blade 15 and its uppermost edge in approximately parallel relation with the cutting edge of the blade 14 formed on the handles 11. It will be observed that when the handles 10 and 11 are moved toward one another so as to close the blade 14 against the anvil blade 15, the blades will first engage one another in a shear-like action and in approximately parallel relationship and subsequently the blade 14 will engage the anvil portion of the anvil blade 15.

By referring to Figure 2 of the drawings it will be seen that the anvil portion of the anvil blade 15 is inclined inwardly and downwardly with respect to the blade portion thereof so that if the blade 14 is sprung out of its normal position so that it fails to directly engage the blade portion of the anvil blade 15, it will engage the anvil portion thereof and the inwardly inclined section thereof will tend to offset any further spreading tendency of the blade despite bending or movement of the shear by the user. It will thus be seen that a positive cutting action is obtained either by a direct shearing action between the respective blade portions 14 and 15 or between the blade and anvil portions 14 and 15. Additionally, the combination of a shearing and cutting action is obtained when the blade 14 is in normal vertical alignment with the blade portion of the anvil blade 15.

Modifications in the formation of the anvil blade structure will occur to those skilled in the art and such modifications may obviously be applied both to the pruning shear illustrated in Figures 1 and 2 of the drawings and to similar shears such as lopping shears as disclosed in Figures 3, 4 and 5 of the drawings.

By referring to Figures 3 and 4 of the drawings a lopping shear will be seen to be disclosed wherein crossed and pivoted shear members 20 and 21 are pivoted to one another by a pivot 22, the shear member 21 having a blade portion 23 formed thereon and the shear member 20 having a blade portion 24 formed thereon immediately beneath the blade 23 and the blade 24 is provided with a movably positioned anvil 25 which is pivotally affixed to the blade 24 by means of a pivot 26. In order that the movably positioned anvil 25 may move only slightly with respect to the plane of the cutting edge of the blade 24, stop members 27 and 28, respectively, are positioned on the blade 24 and beneath the lower edge of the anvil 25. It will thus be seen that when a branch to be severed is positioned between the blade 23 and the blade 24 and the lopping shear closed, the resulting engagement of the blades will first comprise a shearing action and then a cutting action as the blade 23 engages the anvil 25. The movable positioning of the anvil 25 makes it possible for the same to adjust itself to the cutting edge of the blade 23 when the same moves into registry therewith so that a positive parallel alignment is always possible therebetween. It will be obvious that this movable positioning of the anvil 25 greatly facilitates such parallel alignment between the anvil 25 and the blade 23 particularly at such times as the blade 23 is sharpened and portions thereof removed.

By referring to Figure 4 of the drawings the formation of the anvil may be seen and it will be observed that its uppermost portion is inclined inwardly and downwardly a slight degree. It will be obvious to those skilled in the art that the invention illustrated in connection with Figures 3 and 4 of the drawings, and heretofore described, may be applied equally advantageously to lopping shears and the like wherein the blades are formed with registering arcuate cutting surfaces.

By referring to Figure 5 of the drawings a lopping shear will be seen wherein one of the portions of the shear is indicated by the numeral 29 and the other portion by the numeral 30. The shear portions are crossed and pivoted by a pivot 31 and the portion 30 has an arcuate blade 32 formed thereon while the portion 29 has a matching arcuate blade 33 formed thereon. The blade 33 carries a movably positioned anvil 34 which is pivotally affixed thereto by means of a pivot 35 registering in a slot 36 formed in the anvil 34 so that the curved anvil 34 is capable of moving longitudinally of the lopping shear and thereby capable of adjusting itself to perfect registry to the edge of the blade 32. Stop members 37 and 38 are positioned on the blade 33 beneath the lowermost edge of the curved anvil 34 to limit the motion of the anvil.

It will thus be seen that three types of shears have been illustrated, each of which is provided with an anvil type blade or blade and anvil combination and the novelty in this disclosure is believed to reside primarily in the blade and anvil combination, the anvil being formed integrally with the blade or movably positioned with respect thereto as heretofore described.

It will be seen that the constructions disclosed meet the several objects of the invention.

Having thus described my invention, what I claim is:

1. In a pruning shear jaw portions consisting of a blade and a combination blade and anvil, the said combination blade and anvil comprising a secondary blade having an anvil pivotally affixed thereto by a pivot midway between its ends, the anvil having a relatively flat surface for supporting a limb to be cut and positioned alongside the said secondary blade and away from the cutting edge thereof and means on said secondary blade for limiting the tilting movement of the pivoted anvil.

2. In a lopping shear having a pair of crossed and pivoted shear members including blades positioned for shearing action with respect to one another, an anvil pivoted midway between its ends to one side of one of the said blades for self-aligning registry with the other of the said blades.

3. In a lopping shear having a pair of crossed and pivoted shear members including blades positioned for shearing action with respect to one another, an anvil pivoted midway between its ends to one of the said blades for self-aligning registry with the other of the said blades and means on the said anvil supporting blade limiting the movement of the anvil.

4. In a lopping shear having a pair of crossed and pivoted shear members including arcuate blades positioned for shearing action with respect to one another, an arcuate anvil pivoted midway between its ends to one of the said blades for self-aligning registry with the other of the said blades.

5. In a lopping shear having a pair of crossed and pivoted shear members including arcuate blades positioned for shearing action with respect to one another, an arcuate anvil pivoted midway between its ends to one of the said blades for self-aligning registry with the other of the said blades and means on the said anvil supporting blade limiting the movement of the arcuate anvil.

HUGH N. BOYER.

REFERENCES CITED

The following references are of record in the file of this patent:

UNITED STATES PATENTS

| Number | Name | Date |
| --- | --- | --- |
| 1,151,874 | Harris | Aug. 31, 1915 |
| 1,458,878 | Dexter | June 12, 1923 |
| 2,436,260 | Klenk | Feb. 17, 1948 |